May 15, 1956 A. G. FOX 2,746,014
TRANSMISSION METER
Filed Dec. 27, 1951
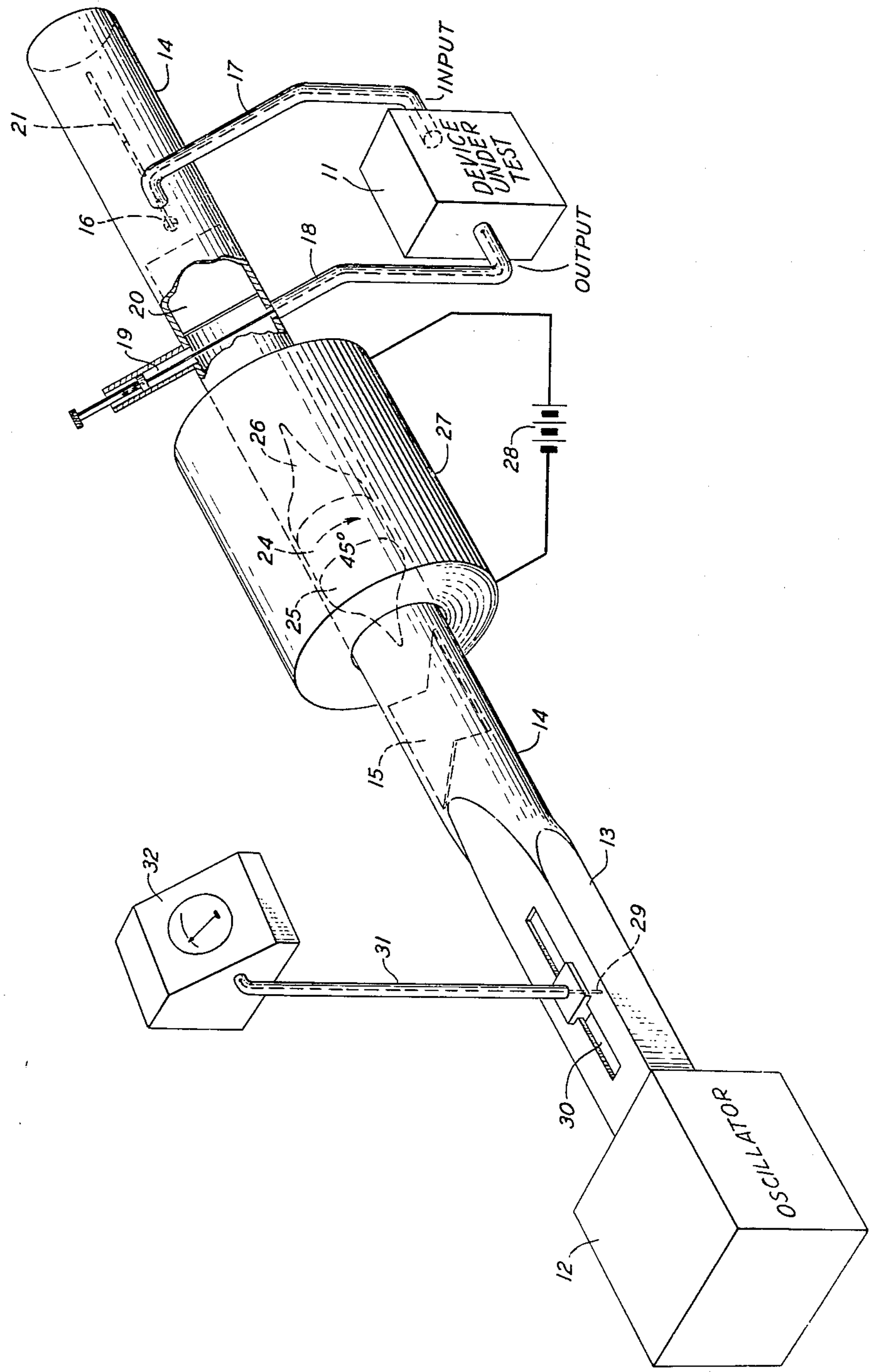
INVENTOR
A. G. FOX
BY
H. O. Wright
ATTORNEY United States Patent Office 2,746,014

Patented May 15, 1956

2,746,014

TRANSMISSION METER

Arthur G. Fox, Eatontown, N. J., assignor to Bell Telephone Laboratories, Incorporated, New York, N. Y., a corporation of New York Application December 27, 1951, Serial No. 263,630

6 Claims. (Cl. 324—58)

This invention relates to microwave transmission systems and, more particularly, to means for measuring the transmission characteristics of microwave devices.

When measuring the transmission characteristics of a microwave device, i. e., the relative gain or loss with an associated phase shift angle experienced by a microwave signal in passing through the device, the conventional method heretofore employed consisted of making similar readings at the input of the device and at the output of the device and comparing these readings. As is well known, certain inaccuracies were inherent in this method. Since, in the usual case, a great difference exists between the magnitude of the voltage or power measured at the input and at the output, non-linearities in the measuring instrument scale between the low scale readings, on the one hand, and the high scale readings, on the other, were reflected in the final comparison.

It is well known also that the standing wave detector technique of measuring a comparison between two quantities of greatly different magnitude is very sensitive and not subject to the aforesaid limitations. The latter technique has, for example, been effectively used in measuring small reflection coefficients.

It is an object of the present invention to make accurate transmission characteristic measurements.

It is a more specific object to adapt the standing wave detector technique of comparing two electrical quantities of greatly different magnitude, to transmission characteristic measurements.

In the specific embodiment of the invention to be hereinafter described in detail, the non-reciprocal property of a Faraday-effect element is employed to remove the reflected wave from the input circuit supplying the device under test and to substitute therefor the wave transmitted through the device. A standing wave detector is thus employed in the input circuit to measure the relative phase and amplitude of the transmitted wave with respect to the incident wave.

These and other objects, the nature of the present invention, its various features and advantages, will appear more fully upon consideration of the illustrative embodiment to be described in detail with reference to the accompanying drawing, which shows in pictorial form a measuring system arrangement in accordance with the invention.

In more detail, the drawing illustrates the components comprising the system adapted to measure the transmission characteristic of the device 11 under test, which system comprises an oscillator 12 supplying a vertically polarized plane wave to rectangular wave guide 13, which tapers into a round wave guide 14. Rectangular wave guide 13 is a connecting polarization-selective terminus of guide 14 in that it will accept and support only $TE_{10}$ waves which have their electric vectors polarized vertically as shown, and therefore a plane of polarization parallel to the narrow wall of guide 13. By means of the smooth transition from rectangular cross-section of guide 13 to the circular cross-section of guide 14, this $TE_{10}$ mode goes over into the vertically polarized $TE_{11}$ mode in guide 14. The dimensions of guides 13 and 14 are preferably chosen so that only the dominant mode in each can be propagated. Positioned in the end of guide 14 adjacent guide 13 is a second polarization-selective terminus of guide 14 comprising a resistive vane 15 disposed in guide 14 in a plane perpendicular to the electric polarization in guide 13 so as to absorb and dissipate all wave components having their plane of polarization perpendicular or orthogonal to the polarization in guide 13. Vane 15 may be several wavelengths long and the ends thereof are tapered in accordance with usual practice to prevent undue reflections from the edges thereof.

At the other end of round guide 14 is a connecting polarization-selective terminal comprising a tunable probe 16 oriented at an angle of preferably 45 degrees with respect to the polarization of waves in guide 13. Probe 16 is adapted to abstract those waves only which have a polarization in the plane of the probe from guide 14 and to apply them by way of coaxial conductor 17 to the input of device 11. The output of device 11 is connected by way of coaxial line 18 to a similar terminal comprising probe 19 disposed in guide 14 at an angle of 45 degrees with respect to the polarization in guide 13 and in a plane perpendicular to probe 16 making probes 19 and 16 conjugate to each other. Highly conductive vanes 20 and 21 are preferably placed in guide 14 in accordance with usual practice adjacent to and in the same plane as probes 19 and 16, respectively, and are adjusted with respect to these probes to give maximum power transfer in the respective circuits. It is obvious to one familiar with the art that the input and output of device 11 may be connected to the proper polarization of waves in guide 14 by other means than the coaxial tunable probes 16 and 19, as illustrated.

Interposed along the length of rectangular wave guide 13 is a standing wave detector system of conventional design. For the purpose of illustration, this detector may comprise an antenna probe or pick-up probe 29 extending through a longitudinal slot 30 in the wide wall of guide 13 and parallel to the plane of polarization of waves therein. Probe 29 is connected by means of a flexible conductor 31 to measuring instrument 32 which may be, for example, a square law detector.

Interposed between vane 15 and probe 19 in the path of electromagnetic waves passing therebetween in guide 14 are suitable means of the type which produces an antireciprocal rotation of the plane of polarization of these electromagnetic waves, in other words, a Faraday-effect element having such properties that an incident wave impressed upon a first side of the element emerges on the second side polarized at a different angle from the original wave, and an incident wave impressed upon the second side emerges upon the first side with an additional rotation of the same angle. Thus, the polarization of a wave passing through the element first in one direction and then in the other undergoes two successive space rotations or space phase shifts in the same sense, thereby doubling the rotation undergone in a single passage. As illustrated by way of example in the drawing, this means comprises a Faraday-effect element 24, with accompanying conical transition members 25 and 26 which may be of polystyrene or ferrite and are provided to cut down reflection from the faces of element 24, mounted inside guide 14 approximately midway between vane 15 and probe 19. As a specific embodiment, element 24 may be a block of magnetic material, for example nickel-zinc ferrite prepared in the manner disclosed in the copending application of C. L. Hogan, Serial No. 252,432, filed October 22, 1951, having a thickness of the order of magnitude of a wavelength. This material has been found to operate satisfactorily as a directionally selective Faraday-effect rotator for polarized electromagnetic waves to an extent up to 90 degrees or more when placed in the presence of a longitudinal magnetizing field of strength which is readily produced in practice and in such thickness is capable of transmitting electromagnetic waves, for example in the centimeter range, with substantially negligible attenuation. Suitable means for producing the necessary longitudinal magnetic field surrounds element 24 which means may be, for the purpose of illustration, a solenoid 27 mounted upon the outside of guide 14 and supplied by a source 28 of energizing current. It should be noted, however, that element 24 may be permanently magnetized. The angle of rotation of polarized electromagnetic waves in such magnetic material is approximately directly proportional to the thickness of the material traversed by the waves and to the intensity of the magnetization to which the material is subjected, whereby it is possible to adjust the amount of rotation by varying or properly choosing the thickness of the material comprising element 24 and the intensity of magnetization supplied by solenoid 27.

In the simplified view of the phenomenon involved as offered in said Hogan application, a plane polarized wave incident upon the magnetic material in the presence of the magnetic field produces two sets of secondary waves in the material, each set of secondary waves being circularly polarized. The two sets of secondary waves are circularly polarized in opposite senses and they travel through the medium at unequal speeds. Upon emergence from the material the secondary waves in combination set up a plane polarized wave, which is in general polarized at a different angle from the original wave. It should be noted that the Faraday rotation depends for its direction upon the direction of the magnetic field. Thus, if the direction of the magnetic field is reversed, the direction of the Faraday rotation is also reversed in space while retaining its original relationship to the direction of the field.

In operation of the measuring system, the vertically polarized wave from oscillator 12 travels along guide 13, past vane 15, unaffected thereby inasmuch as the plane of the vane is perpendicular to the polarziation of the wave, and past transition member 25, to element 24. The thickness of element 24 and the potential from source 28 are adjusted, as pointed out hereinbefore, to give a 45 degree rotation of the plane of polarization in the same direction as the angle existing between the plane of the wave in guide 13 and the plane of probe 16. Thus, the polarization of the wave is rotated 45 degrees in a clockwise direction as indicated by the arrow on element 24 in the drawing, thereby bringing the plane of polarization at right angles to probe 19 and its associated vane 20, the preferred direction for transmission unaffected past vane 20 and probe 19, and into the preferred polarization for transmission by means of probe 16 along line 17 to the input of device 11.

Should there be any reflection of wave energy from the input of device 11, the reflected wave will pass along line 17 and will be excited in guide 14 in a polarization parallel to probe 16, the preferred direction for transmission unaffected past vane 20 and probe 19, to element 24. Element 24 rotates the polarization of the reflected wave 45 degrees in the direction of the arrow bringing the wave into a polarization parallel to resistive vane 15, whereby it is essentially dissipated and absorbed so that no component of the reflected wave reaches guide 13. Thus, the reflected wave has been removed from the input circuit and will have no part in the reading registered by the standing wave detector.

The wave from the output of device 11, applied by way of line 18, is excited by probe 19 in guide 14 in a plane of polarization parallel to that of the probe. On passing element 24, this wave is rotated 45 degrees in the direction of the arrow bringing the wave into a plane perpendicular to vane 15, the preferred direction for transmission past vane 15, and into a plane of polarization identical to that of the input wave energy in guide 13. The interaction between the incident input energy and the energy transmitted through device 11 sets up a standing wave in guide 13 having maximum and minimum values. In accordance with conventional standing wave detector technique, probe 29 is moved along slot 30 and these maximum and minimum values are observed on meter 32. From these readings the transmission characteristics of device 11 are calculated as follows.

Assuming that the standing wave detector indicates a maximum to minimum voltage ratio for the standing wave of $\rho$, the magnitude of the ratio of the voltage of the transmitted wave $V_2$ to the voltage of the incident wave $V_1$ will be given by $$\left|\frac{V_2}{V_1}\right|=\frac{\rho-1}{\rho+1} \qquad (1)$$

If there is no loss in the structure between the standing wave detector and the device 11 under test, the above ratio will represent the magnitude of the transfer ratio for device 11 under test. If the intervening structure has some loss, this loss may be determined and accounted for by removing device 11 under test and connecting the coaxials 17 and 18 directly together. The standing wave ratio ($\rho$) then obtained can be used to compute the transmission loss for the test structure by means of the above formula, and this loss may then be used to correct the result obtained when the device under test is in place.

The phase of the transfer ratio may also be measured by first noting the position of a standing wave minimum when the coaxials 17 and 18 are connected directly together, and then observing the amount and direction of shift of this minimum when the device under test 11 is inserted between 17 and 18. The phase lead will be given by $$\left(n+\frac{l}{\lambda_g}\right)(180) \text{ degrees}$$

where $l$ is the displacement of the standing wave minimum in the direction away from the device under test, $\lambda_g$ is the wavelength in wave guide 13, and $n$ is an integer. Thus, if the device under test 11 causes a displacement of the standing wave minimum toward the device, this is interpreted as a negative $l$ and hence a negative or lagging phase shift. The presence of the integer $n$ represents an inherent ambiguity of $n$ half wavelengths or $n\times180$ degrees in the total phase shift.

It should be noted that a further embodiment of the transmission characteristic measuring system having identical properties to that of the foregoing system may be obtained by connecting the standing wave detector to one branch of the four branch switching system disclosed in Fig. 9 of said copending application of C. L. Hogan, connecting the device under test between two other branches of said switching system, and terminating in a reflectionless manner the remaining branch of said system.

In all cases, it is understood that the above-described arrangement is simply illustrative of one of the many possible specific embodiments which can represent applications of the principles of the invention. Numerous and varied other arrangements can readily be devised in accordance with these principles by those skilled in the art without departing from the spirit and scope of the invention.

What is claimed is:

1. In combination, a source of microwave energy, a rectangular wave guide having an end connected to said source, a circular wave guide having an end coupled for wave energy polarized in a given plane to the other end of said rectangular guide, an antireciprocal Faraday-effect rotator producing a forty-five degree rotation of plane polarized microwave energy, said rotator being disposed in said circular guide, a pair of conjugate microwave connections each coupled to the other end of said circular guide for wave energy in planes displaced forty-five degrees from said given plane, a microwave circuit connected between said connections, and a standing wave detector interposed along said rectangular guide.

2. Apparatus for measuring the transmission characteristic between the input and output of an electromagnetic wave energy circuit, said apparatus comprising a wave energy source, means for supporting said energy in a plurality of polarizations, means for coupling energy from said source to one of the polarizations of energy in said supporting means, means for coupling said input and said output respectively to other polarizations in said supporting means, means located in said supporting means for rotating wave energy in said one polarization into the polarization to which said input is connected and for rotating wave energy in the polarization to which said output is connected into said one polarization, and means included in said coupling means for comparing the wave energy flowing in two directions through said coupling means.

3. Apparatus for measuring the transmission characteristic of an electromagnetic wave energy circuit, said apparatus comprising a wave-guide section adapted to support said energy in orthogonal polarizations, a first pair of wave polarization-selective termini at one end of said guide each effective for one orthogonal polarization of wave energy in said one end, a second pair of wave polarization-selective termini at the other end of said guide effective for orthogonal polarizations respectively related by a given angle to the polarizations in said one end, an antireciprocal Faraday-effect rotator for plane polarized electromagnetic energy interposed in said guide between said ends and having an angle of rotation for said energy equal to said given angle, three of said termini being each a connecting terminus by which said energy may be coupled to and from said guide, means connecting said circuit between two of said three termini, a source of signal energy connected to the other of said three termini, and a standing wave detector interposed between said source and said last-named terminus, the remaining terminus being a resistive termination by which energy effected thereby is dissipated.

4. In combination, a high frequency electrical wave circuit having an unknown transmission characteristic and means for measuring said characteristic, said means comprising a first pair of wave polarization-selective termini and a first common circuit therefor, a second pair of wave polarization-selective termini and a second common circuit therefor, the termini of each pair being in conjugate relationship to each other and in selective coupling relationship to the common circuit therefor, means connecting said high frequency circuit between said second pair of termini, means for connecting said first and second common circuits, said connecting means producing a unidirectional change in the space-phase relationship of electrical energy transmitted between said common circuits, means for supplying signal energy to one terminus of said first pair, and a standing wave detector interposed between said last-named means and said other terminus.

5. The combination according to claim 4 wherein the other of said first pair of termini is adapted to dissipate wave energy of the polarizations selected thereby.

6. Apparatus for measuring the transmission characteristic between the input and output of an electromagnetic wave energy circuit, said apparatus comprising a coupling network having at least three branches being connected within said network with one branch thereof connected to a second branch thereof for electrical transmission between said branches in a given direction only, said second branch being connected to a third branch only for a direction of transmission in said second branch opposite to said given direction, said input of said circuit being connected to said third branch, said output of said circuit being connected to said one branch, a source of wave energy being connected to said second branch, and means for comparing the power flowing in two directions interposed between said source and said second branch.

References Cited in the file of this patent

UNITED STATES PATENTS

| | | |
|---|---|---|
| 2,410,838 | Ring | Nov. 12, 1946 |
| 2,436,828 | Ring | Mar. 2, 1948 |
| 2,454,042 | Dettinger | Nov. 16, 1948 |
| 2,606,248 | Dicke | Aug. 5, 1952 |
| 2,644,930 | Luhrs et al. | July 7, 1953 |